United States Patent [19]

Thomas et al.

[11] Patent Number: 5,561,463
[45] Date of Patent: Oct. 1, 1996

[54] VIDEO SIGNAL CODING USING SUB-BAND CODING AND PHASE-SEGREGATED CODING TECHNIQUES

[75] Inventors: Graham Thomas, Heathfield; Michael G. Croll, Horsham, both of United Kingdom

[73] Assignee: British Broadcasting Corporation, London, United Kingdom

[21] Appl. No.: 307,678

[22] PCT Filed: Apr. 27, 1993

[86] PCT No.: PCT/GB93/00870

§ 371 Date: Sep. 22, 1994

§ 102(e) Date: Sep. 22, 1994

[87] PCT Pub. No.: WO93/22878

PCT Pub. Date: Nov. 11, 1993

[30] Foreign Application Priority Data

Apr. 27, 1992 [GB] United Kingdom ............... 9209052

[51] Int. Cl.[6] .................................................. H04N 11/02
[52] U.S. Cl. .......................... 348/392; 348/396; 348/398; 348/488
[58] Field of Search ..................................... 348/391, 393, 348/396–398, 488, 491–493, 392

[56] References Cited

U.S. PATENT DOCUMENTS

| | | | |
|---|---|---|---|
| 4,003,077 | 1/1977 | Hickok | 348/491 |
| 4,622,578 | 11/1986 | Rzeszewski | 358/12 |
| 4,827,336 | 5/1989 | Acampora et al. | 348/396 |

FOREIGN PATENT DOCUMENTS

| | | |
|---|---|---|
| 0070154 | 1/1983 | European Pat. Off. . |
| 852512 | 10/1960 | United Kingdom . |
| 1534269 | 11/1978 | United Kingdom . |
| 1534270 | 11/1978 | United Kingdom . |
| 1534268 | 11/1978 | United Kingdom . |
| 2044577 | 10/1980 | United Kingdom . |
| 2101835 | 1/1983 | United Kingdom . |
| 2115638 | 9/1983 | United Kingdom . |
| 2253538 | 9/1992 | United Kingdom . |

OTHER PUBLICATIONS

Drewery, Dr. J. O., "A Compatible Improved PAL System", EBU Review—Technical, no. 215, Feb. 1986, pp. 3–18.
Sandbank, C. P. and Moffat, M. E. B., "High Definition Television and Compatibility with Existing Standards", SMPTE Journal, vol. 92, No. 5, May 1983, pp. 552–561.
Jackson, R. H. and Tan, S. L., "System Concepts in High Fidelity Television", International Broadcasting Convention, IEE 1982 London, GB, pp. 135–139.
Croll, et al., "An Example of a Phase–Segregated Enhanced Pal Broadcasting System", BBC Research Department Report, No. 6, 1992, pp. 1–34, published Feb. 1993.
Drewery, J. O., "The Filtering of Luminance and Chrominance Signals to Avoid Cross–Colour in a PAL Colour System", BBC Research Department Report, No. 36, 1975, pp. 1–36.
Oliphant, A., "Weston Clean PAL", BBC Research Department Report, vol. 1, Feb. 1980, pp. 1–26.
Oliphant, A. and Eng, C., "An Extended PAL System for High–Quality Television", BBC Research Department Report, vol. 11, 1981, pp. 1–9.

Primary Examiner—Victor R. Kostak
Attorney, Agent, or Firm—Kevin J. Fournier; Milton Oliver

[57] ABSTRACT

A composite video signal is formed in which high luminance frequencies are modulated so that they occupy frequencies above the chrominance band. A sub-band coder is used to split the luminance frequency band into high and low frequencies at the coder, and an inverse sub-band coder combines the high-frequency luminance and the chrominance components. The two resultant signals are applied to a phase-segregated Weston Clean PAL coder to provide a composite video signal, which is compatible with a conventional PAL signal.

15 Claims, 9 Drawing Sheets

VIDEO SIGNAL CODING USING SUB-BAND CODING AND PHASE-SEGREGATED CODING TECHNIQUES

BACKGROUND OF THE INVENTION

This invention relates to a method of video signal coding.

The PAL composite video coding standard has a number of limitations that restrict the picture quality that such a signal can convey. These limitations are well known; they include limited luminance and chrominance resolution, cross-color and cross-luminance.

Several methods are known that aim at improving the image quality that can be conveyed by a PAL signal. For example, multidimensional filtering techniques may be employed to help to separate chrominance and luminance information, as described in BBC Research Department Report No. 1975/36, 'The filtering of luminance and chrominance to avoid cross-color in a PAL color system'. This approach reduces significantly the effects of cross-color and cross-luminance but cannot eliminate them completely; it also forces the use of luminance and chrominance passbands that have a sub-optimum shape.

Another known technique for improving the quality of a PAL signal is the so-called phase-segregated or 'Weston' clean PAL, as described in BBC Research Department Report No. 1980/1, 'Weston clean PAL'; see also U.K. Patents 1,534,268–270. This coding method separates luminance and chrominance information by phase rather than frequency and thus allows perfect separation of the two signals, eliminating cross effects. It also allows a significant amount of flexibility in choosing the shapes of the passbands of the luminance and chrominance signals. In particular, the luminance part of the signal can carry samples at a rate of twice the color subcarrier frequency with negligible crosstalk between samples, allowing so-called spectrum-folding techniques to be used. However, the overall spectral volume of the luminance signal is limited to that equivalent to a signal having a bandwidth equal to the color subcarrier frequency. The resolution of the chrominance signal may however be increased by increasing the overall bandwidth of the composite signal.

A third technique has been proposed for use in situations where the bandwidth of the composite signal may be increased above the usual figure of about 5.5 MHz. (The numerical values in this specification are given by way of example and are based on the PAL System I television standard.) This technique, known as Extended PAL, is described in BBC Research Department Report No. 1981/11, An Extended PAL system for high-quality television'; see also U.K. Patent Specification 2,101,835. In this technique, an additional signal carrying high frequency luminance information is placed above the frequency band that carries the chrominance information and above the subcarrier frequency used to carry the sound signal. Luminance signals having a horizontal bandwidth above about 3.5 MHz are separated from the normal low-frequency luminance signal and frequency-shifted by the subcarrier frequency before transmission. Cross effects are virtually eliminated since there is very little overlap between chrominance and luminance signals. The horizontal resolution of the luminance signal transmissible by such a method is determined by the bandwidth of the channel available, being equal to the channel bandwidth less the color subcarrier frequency. Although the system offers an increased luminance bandwidth compared to that of other PAL coding methods, it does not have the flexibility in determining the shape of the luminance passband afforded by Weston clean PAL. It also makes sub-optimum use of the available bandwidth, since gaps need to be left between the various parts of the signal spectrum.

A fourth technique known as enhanced or compensated Weston clean PAL is described in our UK Patent Specification 2,115,638. In this technique, a "compensation signal" is formed consisting of those parts of the luminance and chrominance signal spectrum that a Weston clean PAL signal cannot represent. The compensation signal consists of high vertical frequency luminance information having a horizontal frequency between 3.3 MHz and 5.5 MHz, high vertical frequency chrominance information having a horizontal bandwidth from 0 to 1.1 MHz, and all chrominance information having a horizontal bandwidth between 1.1 and 2.2 MHz. The luminance and chrominance compensation signals are combined into one signal using a second Weston PAL assembler, and the combined signal is modulated onto a carrier at twice the subcarrier frequency. The compensation signal is separated from the normal Weston PAL signal at the decoder using simple low- and high-pass filters. This technique is limited to providing horizontal resolution up to 5.5 MHz and cannot make use of the flexibility of a basic Weston PAL coding system to allow the shape of the luminance pass-band to be optimised using spectrum folding. Further, it requires the use of sharp-cut filters to separate the normal and compensation signals. Sharp cut band-pass filters must be used in both the coder and decoder in order for the normal and compensated signals to be combined to yield a perfect reconstruction of the original signal.

SUMMARY OF THE INVENTION

The invention in its various aspects is defined in the appended claims, to which reference should now be made. Advantageous features of the invention are set forth in the appendant claims.

A PAL coding method embodying the present invention and which is described in more detail below combines the advantages of Weston PAL coding with those of Extended PAL. It improves upon the technique of enhanced or compensated Weston clean PAL by removing the need for any sharp-cut filters and allowing more flexibility in determining the shape of the luminance and chrominance pass-bands. It is aimed particularly at the coding of video signals within a studio environment where existing signal paths can pass signals having a higher bandwidth than a conventional PAL signal. In particular, the proposed system is well-matched to digital composite video equipment operating at a sampling rate of four times the color subcarrier frequency (4 fsc). When used with such equipment it can provide an essentially transparent channel for luminance sampled at a rate of 3 fsc and chrominance sampled at fsc, in such a way that the coded signal can be decoded using a conventional PAL decoder to produce an acceptable 'compatible' picture for video monitoring purposes. The use of the proposed coding system enables such composite studio equipment to produce signals whose quality is better matched to that of enhanced broadcasting methods such as MAC or PALplus, particularly when images having an aspect ratio of 16:9 are used.

In the preferred embodiment of the present invention, the coded signal has a bandwidth of 2 fsc and conveys luminance signals with a spectral volume equivalent to a bandwidth of 3 fsc/2, and chrominance signals with a spectral volume equivalent to fsc/2. This is achieved by splitting the luminance spectrum into two signals; one conveying the low two-thirds of the spectrum and the other carrying the upper third. The low-frequency luminance signal is treated in the same way as in a conventional Weston PAL coder. The high-frequency signal is combined with the chrominance signal in such a way as to occupy the upper part of a combined spectrum, whilst the chrominance signal occupies the lower part. This combined signal is then modulated at the subcarrier frequency fsc and is then treated in the same way as the chrominance signal in a conventional Weston PAL coder. The separation of the luminance signal into two parts is achieved using the known technique of sub-band coding. The high frequency luminance signal is combined with the chrominance signal using a technique derived from the principle of sub-band coding.

Thus the spectrum up to 2 fsc is utilized very efficiently, without the need for gaps between the various parts of the signal spectrum.

BRIEF DESCRIPTION OF THE DRAWINGS

The invention will now be described in more detail by way of example with reference to the drawings in which.

DETAILED DESCRIPTION OF THE PREFERRED EMBODIMENTS

Since the present invention relates to an extension of the Weston (or 'phase-segregated') Clean-PAL coding technique referred to earlier, a brief summary of this technique will be given first.

Figure 1:
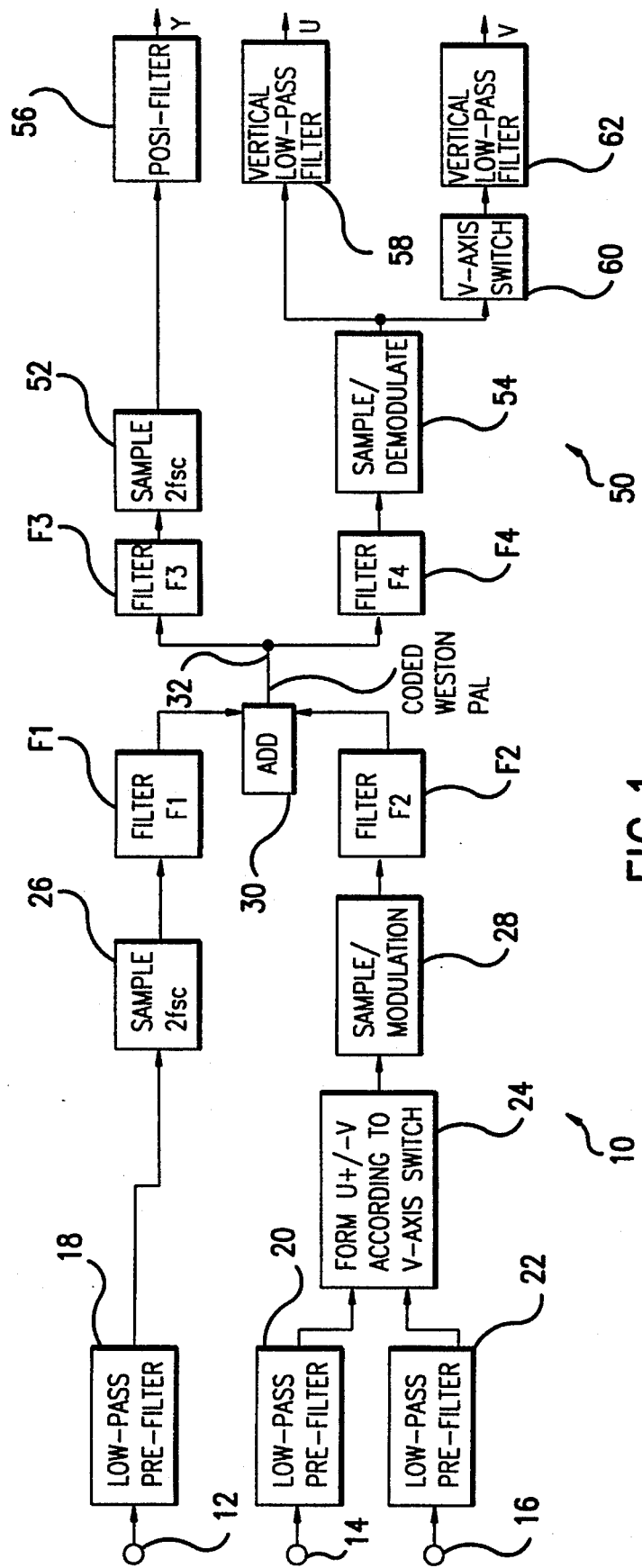
FIG. 1 is a block diagram of a known Weston clean PAL coder and decoder.

FIG. 1 shows a block diagram of a Weston Clean PAL coder 10 and decoder 50, operating at a sampling frequency of 4 fsc. The coder 10 has inputs 12, 14, 16 for receiving respectively the luminance signal Y and the chrominance component signals U and V. To each input is connected a corresponding low-pass pre-filter 18, 20, 22, and to the outputs of the low-pass filters 20, 22 for the chrominance component is connected a circuit 24 which forms U±V, with the plus or minus sign being dependent upon the V-axis PAL switch signal. The luminance signal from the low-pass filter 18 is applied to a sampling circuit which samples at 2 fsc, and the sampled signal is then applied to a first filter F1. The U±V signal from circuit 24 is applied to a sampling and modulation circuit 28, which samples at 2 fsc and puts the chrominance on an fsc subcarrier. The output of the sampling and modulation circuit 28 is applied to an adder 30. Adder 30 provides a coded Weston PAL signal which can be transmitted over a transmission link 32.

The decoder 50 has filters F3, F4 connected to the transmission link 32 to receive the coded Weston PAL signal. The output of filter F3 is sampled at 2 fsc in a sampler 52, and the output applied to a post-filter 56 which provides the luminance output. The output of filter F4 is demodulated and sampled in a sample/demodulation circuit 54, and the output passed to a vertical low-pass post-filter 58 which provides the U component output, and through a V-axis switch circuit 60 to a vertical low-pass post-filter 62 which provides the V component output.

The filters F1 and F2 and the associated samplers 26, 28 and adder 30 in the coder 10 are termed the 'assembler'; the filters F3 and F4 and associated samplers 52, 54 in the decoder are termed the 'splitter'. These enable sampled luminance and chrominance signals to be transmitted without interaction in a signal closely resembling normal PAL. The task of the pre-filters 18, 20, 22 and post-filters 56, 58, 62 is to allow these signals to be used in an optimum way to convey the required resolution.

In operation of a conventional Weston PAL coder, the incoming luminance signal is digitized, pre-filtered and sampled at 2 fsc. The incoming chrominance signals are also digitized, pre-filtered and line-multiplexed (U+V, U−V). The resulting chrominance signal is then modulated at fsc.

The two sampled signals are filtered by the digital filters F1 and F2 whose outputs are summed in adder 30. The characteristics of these filters are chosen so that, when concatenated with the decoder filters F3 and F4, they separate the chrominance and luminance signals by phase rather than by frequency. They are also designed so that the combined luminance and chrominance signal closely resembles a conventional PAL signal. Each filter takes contributions from two successive video lines. In the decoder, the two filters F3 and F4 act on the combined signal in such a way that their outputs, once sampled at 2 fsc and demodulated at fsc, in the manner indicated reproduce the luminance and chrominance signals Y,U,V respectively. In the case of the luminance, the original 2 fsc samples are reproduced exactly; the chrominance signals are however band-limited to the size of the channel bandwidth above fsc.

Perfect reconstruction of the luminance and chrominance signals is guaranteed if the following relationships are satisfied:

$$F1.F3 = N_1 + jS_3 \qquad (1)$$

$$F2.F4 = N_2 + jS_4 \qquad (2)$$

$$F1.F4 = jS_1 + A_1 \qquad (3)$$

$$F2.F3 = jS_2 + A_2 \qquad (4)$$

where $N_1$ and $S_2$ are Nyquist filters, each satisfying the relationship:

$$N(fsc+f) = 1 - N(fsc-f),$$

where $S_1$ and $S_2$ are filters with a response symmetrical about fsc, each satisfying the relationship:

$$S(fsc+f)=S(fsc-f),$$

and where $A_1$ and $A_2$ are filters whose response is anti-symmetric about the carrier frequency, that is:

$$A(fsc+f)=-A(fsc-f).$$

Conditions 3 and 4 ensure that the re-sampling operation in the splitter, if it is co-phased with the sampling in the assembler, will reject luminance-chrominance crosstalk since such signals will be in quadrature with the sampling phase. In addition to satisfying these criteria, the filters must also have a combing action in the chrominance region so that the assembled signal closely resembles a PAL signal. In particular, at fsc the filter F2 should have a vertical response equivalent to a filter that adds across a line delay (coefficients of ½, ½ on successive field lines) in order to convert the U±V chrominance signal into normal PAL chrominance. Further details of the Weston assembler and splitter can be found in our U.K. Patent Specification 2,253,538 published on Sep. 9, 1992.

Figure 2:
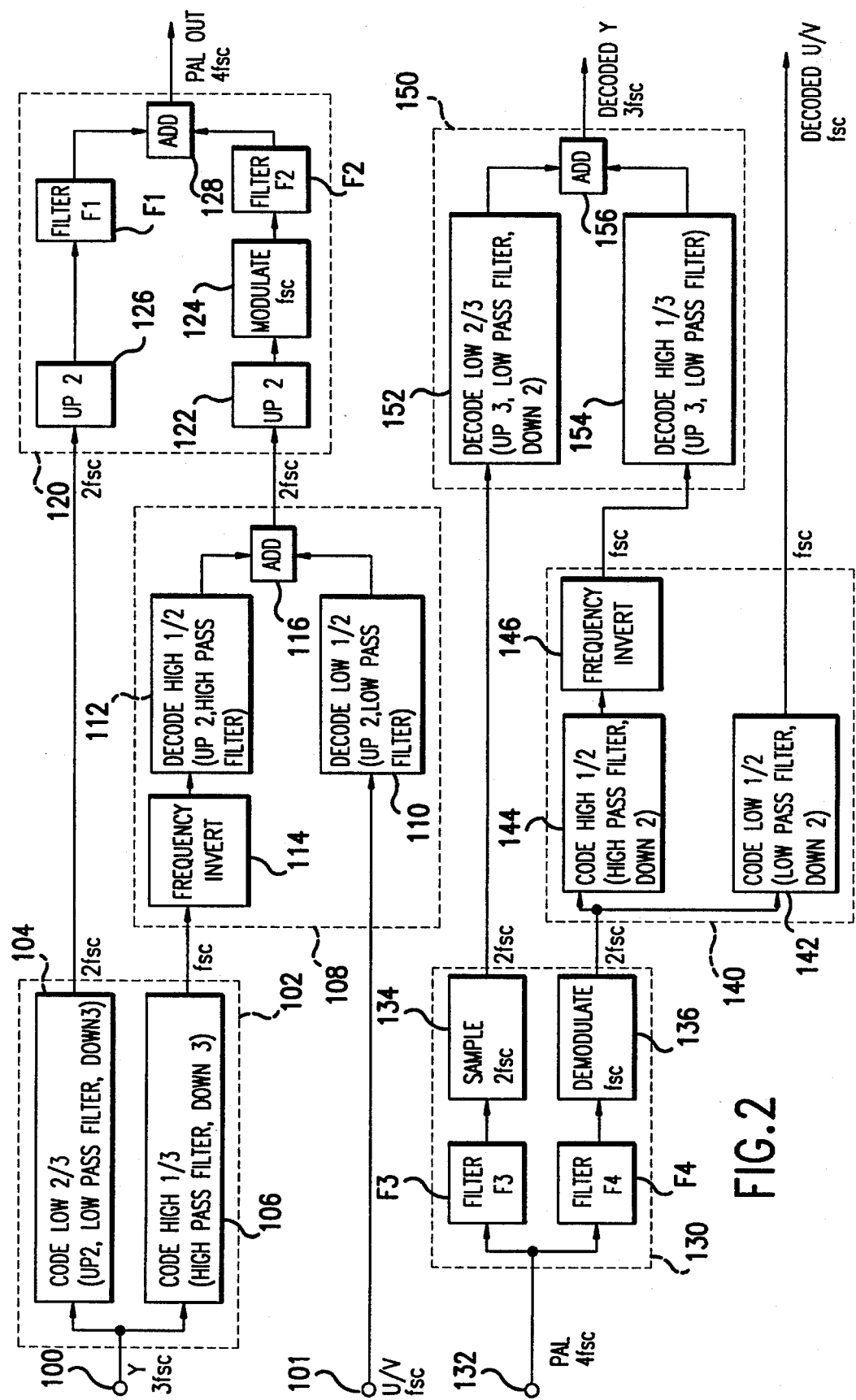
FIG. 2 is a block diagram of an encoder and decoder embodying the present invention, pre- and post-filters being omitted.

In a preferred embodiment of a coder according to the present invention as illustrated in FIG. 2, the luminance signal is sampled at 3 fsc after initial pre-filtering to a bandwidth that can be supported by a sample rate of 3 fsc, rather than the 2 fsc in the implementation of Weston Clean PAL described above. This reflects the wider luminance bandwidth now made available. The digitizing, pre-filtering and sampling operations have been omitted from FIG. 2 for clarity, so that the top part of FIG. 2 shows simply the elements replacing the filters F1, F2 and adder 30 of FIG. 1, and the bottom part of FIG. 2 shows the elements replacing the filters F3 and F4 of FIG. 1. In a simple embodiment, the pre-filtering is purely horizontal (i.e. one-dimensional) and consists of a low-pass filter with a cut-off frequency of 3 fsc/2. However, it is also possible to employ multi-dimensional filters to change the spatio-temporal shape of the pass-band, as can be done with conventional Weston Clean-PAL at 2 fsc. This technique is well known, and is often referred to as sub-Nyquist sampling or spectrum folding; an example of its use with Weston Clean PAL is given in the paper 'Compatible enhancement of terrestrial PAL TV transmission' by J. O. Drewery et al., IBC'90, IEE Conference Publication No. 327, pages 60–64. In the preferred embodiment, the 3 fsc sampling lattice is quincunxial within a field and has a four-field repeat period, resembling a horizontally-compressed version of the 2 fsc sampling pattern used in conventional Weston Clean PAL; other lattices may also be used (subject to them having the same sampling rate) to allow passbands of other shapes to be used.

The sampled luminance signal at 3 fsc received at input 100 is split in a luminance sub-band splitter 102 into two signals, one representing the low frequency part of the spectrum of the signal up to fsc, the other representing the higher frequencies from fsc to 3 fsc/2. These two signals are sampled at 2 fsc and fsc respectively. This frequency split can be achieved using so-called 'sub-band' filters, which allow a signal to be divided into two frequency bands which can be resampled at appropriately lower sampling rates. Thus in the splitter 102 the signal is applied to a low-frequency coder 104 which first doubles the sampling frequency, then applies a low-pass filter function, and finally divides the sampling frequency by three. Similarly a high-frequency coder 106 applies a high-pass filter function to the 3 fsc input, and then divides the sampling frequency by three. The characteristics of the filters are such that when the sampled signals are subsequently up-sampled and filtered and then added together, the original signal is reproduced exactly. For further information concerning such filters see for example Pearson, D. E. (Ed.) Image Processing, McGraw Hill, 1990. The filters used to split a signal into separate frequency bands prior to subsampling are termed analysis filters. The filters used to reconstruct the signal after up-sampling are termed synthesis filters. The luminance sub-band splitting filters may be horizontal one-dimensional filters, in which case the split will occur at fsc; alternatively two-dimensional filters may be used.

In order to obtain the unequal band split (dividing the luminance passband into the low two-thirds and the upper third), two different approaches are possible. One approach is to arrange that the luminance signal at the input to the sub-band analysis filters is at a sampling rate of 3 fsc and to use sub-band filters designed for performing unequal splits. A method of designing such filters is described in the paper 'Matrix convertion for improvement of vertical-temporal resolution in letter-box wide-aspect TV' by N. Suzuki et al., SMPTE Journal, Vol. 100 No.2, February 1991, pages 104–110. An alternative approach is to use a sample rate of 4 fsc for the luminance signal at the input to the sub-band analysis fillers and to use sub-band filters designed for splitting a signal into two equal parts. Design methods for such filters are well-known and are generally at a better state of development than those for designing filters for unequal splits. The output of the high-pass sub-band analysis filter is then subsampled by an additional factor of 2 over and above the usual 2:1 subsampling used after such an analysis filter. Correct operation of the coder then relies upon the luminance pre-filter removing energy from the part of the spectrum that cannot be supported by this reduced sampling rate. Indeed, the pre-filter can be placed in the signal path for the high-pass sub-band analysis filter instead of in the signal path feeding both the high and low-pass filters, since it will have little or no effect in the region of the spectrum passed by the low-pass analysis filter. Correct operation also relies upon the low- and high-pass sub-band filters having responses of substantially unity and zero respectively for frequencies beyond 3 fsc/2.

The incoming color difference signals U and V are combined to form a weighted signal of U+V and U−V on alternate lines as in a conventional Weston PAL coder. The resulting chrominance signal is then pre-filtered and sampled at fsc, rather than being modulated at fsc as in a conventional Weston coder. These operations are not shown in FIG. 2, but may be seen by analogy with FIG. 1. As with the luminance signal, the pre-filtering may be simply one-dimensional or use may be made of sub-Nyquist sampling techniques to allow the shape of the spectral volume of the chrominance signal to be optimized. In the case of one-dimensional filtering, a horizontal bandwidth of fsc/2 can be obtained.

The sampled chrominance signal received at an input 101 and the sampled high-frequency luminance signal, each sampled at fsc, are then combined into one signal at 2 fsc in a chrominance and HF luminance combiner 108 using a technique we have termed 'inverse sub-band coding'. This technique is based on the principles of sub-band coding referred to earlier. Whereas sub-band coding may be used to split a signal into two separate signals which are subsequently recombined, inverse sub-band coding may be used to combine two separate signals in such a way that they may subsequently be separated perfectly, as explained below. An "inverse sub-band coder" is thus the same as a "sub-band combiner", and an "inverse sub-band decoder" is the same as a "sub-band splitter".

Figure 3:
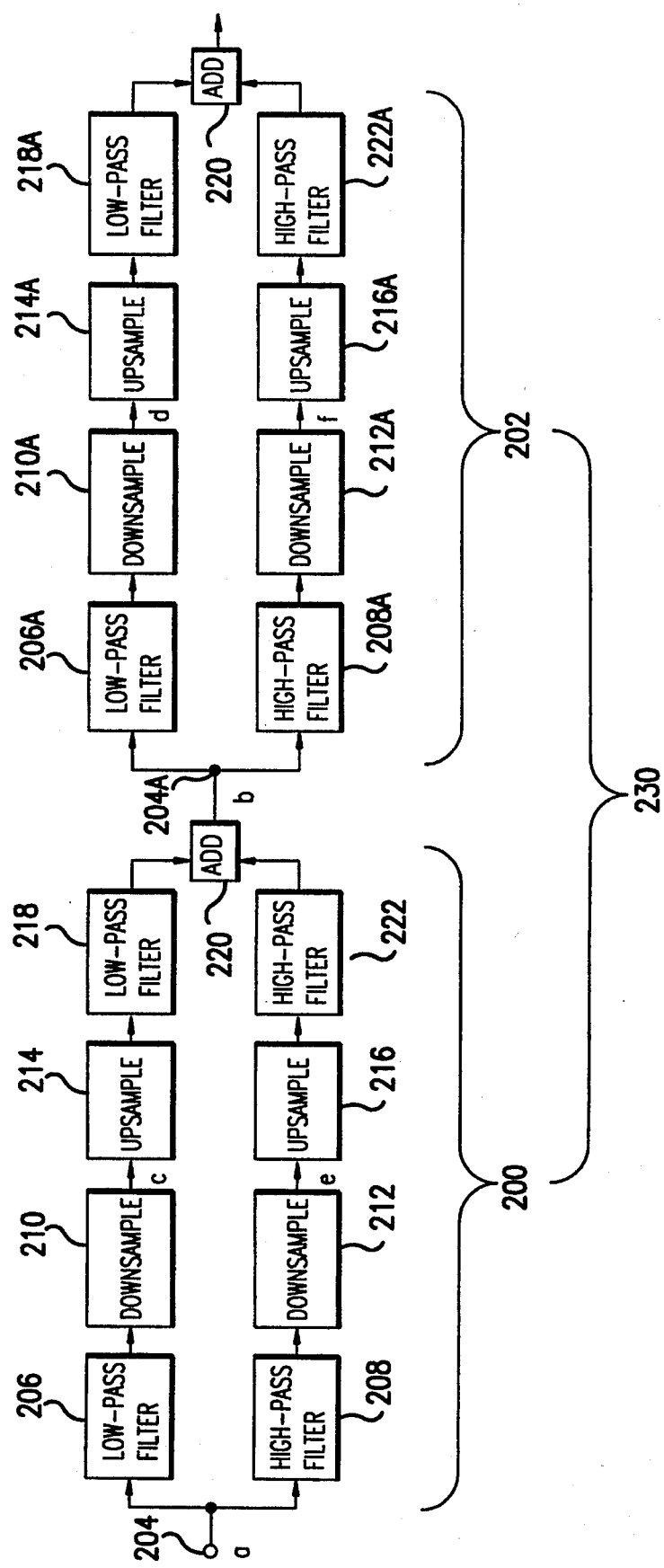
FIG. 3 is an explanation of the process of inverse sub-band coding.

The principle of inverse sub-band coding may be readily understood by considering two cascaded sub-band coder-decoder pairs shown in FIG. 3. FIG. 3 shows a first sub-band coder-decoder pair 200 and a second sub-band decoder pair 202. The first pair 200 comprises an input 204 coupled to a low-pass filter 206 and a high-pass filter 208. Each of these is connected to a respective down-sampler 210, 212 which in turn is coupled to a respective up-sampler 214, 216. The up-sampler 214 is coupled through a low-pass filter 218 to one input of an adder 220, and the up-sampler 216 is coupled through a high-pass filter 222 to the adder 220. The second pair is identical and in FIG. 3 carries the same reference numerals with the addition of the suffix A.

Assuming each sub-band decoder gives perfect reconstruction of the signal at the input of the coder, then clearly the input signal (b) to the second sub-band coder must be the same as that (a) at the input to the first. It therefore follows that the signal (c) at the input of the upsampler 214 in the low frequency path in the first sub-band decoder is equal to the signal (d) at the output of the downsampler 210A in the same branch of the following coder. By a similar argument, the signals at points e and f must be the same. We have termed the up-samplers 214, 216 and filters 218, 222 that combine signals (c) and (e) to make (b) an inverse sub-band coder, and the filters 206A, 208A and down-samplers 210A, 212A that split the combined signal (b) into the two signals (d) and (f) an inverse sub-band decoder. The two together form an inverse sub-band coder-decoder pair 230. It is interesting to note that the Weston assembler and splitter are themselves a form of inverse sub-band coder and decoder.

Reverting to FIG. 2, the chrominance signal 101 is fed to the low-frequency input to an inverse sub-band coder 108, which produces a signal sampled at 2 fsc with the chrominance signal occupying the lower half of the spectrum. This inverse sub-band coder in the combiner 108 comprises a tow-frequency decoder 110 and a high-frequency decoder 112. The low-frequency decoder 110, corresponding to the components 214, 218 in FIG. 3, doubles the sampling frequency and then applies a low-frequency filter function. The high frequency luminance signal is fed to the high-frequency input, which places the signal to the upper half of the spectrum. The high frequency luminance signal is frequency-inverted in an inverter 114 (by inverting alternate samples) prior to this process.

This is because the sub-band decoding process itself performs a frequency inversion of the signal, yet it is desirable to have high luminance frequencies occupying the highest frequencies in the spectrum of the final signal (that is, no net frequency inversion). This ensures that the effect of band-limiting the final coded signal is to attack only the highest luminance frequencies. The high-frequency decoder 112 doubles the sampling rate and then provides a high-pass filter function. The outputs of the decoders 110, 112 are added in an adder 116.

The combined signal from combiner 108 containing chrominance information in the lower half of the band and high luminance frequencies in the upper half of the band is applied to one input of a Weston PAL assembler 120 where its sampling frequency is doubled in a circuit 122, is modulated at fsc in a circuit 124, and is passed to the input of filter F2. The operation of the assembler itself is exactly as in conventional Weston Clean PAL. The 2 fsc luminance signal is applied to a frequency doubler 126 in the assembler 120, and thence to the filter F1. The outputs of filters F1 and F2 are added in an adder 128.

Figure 4:
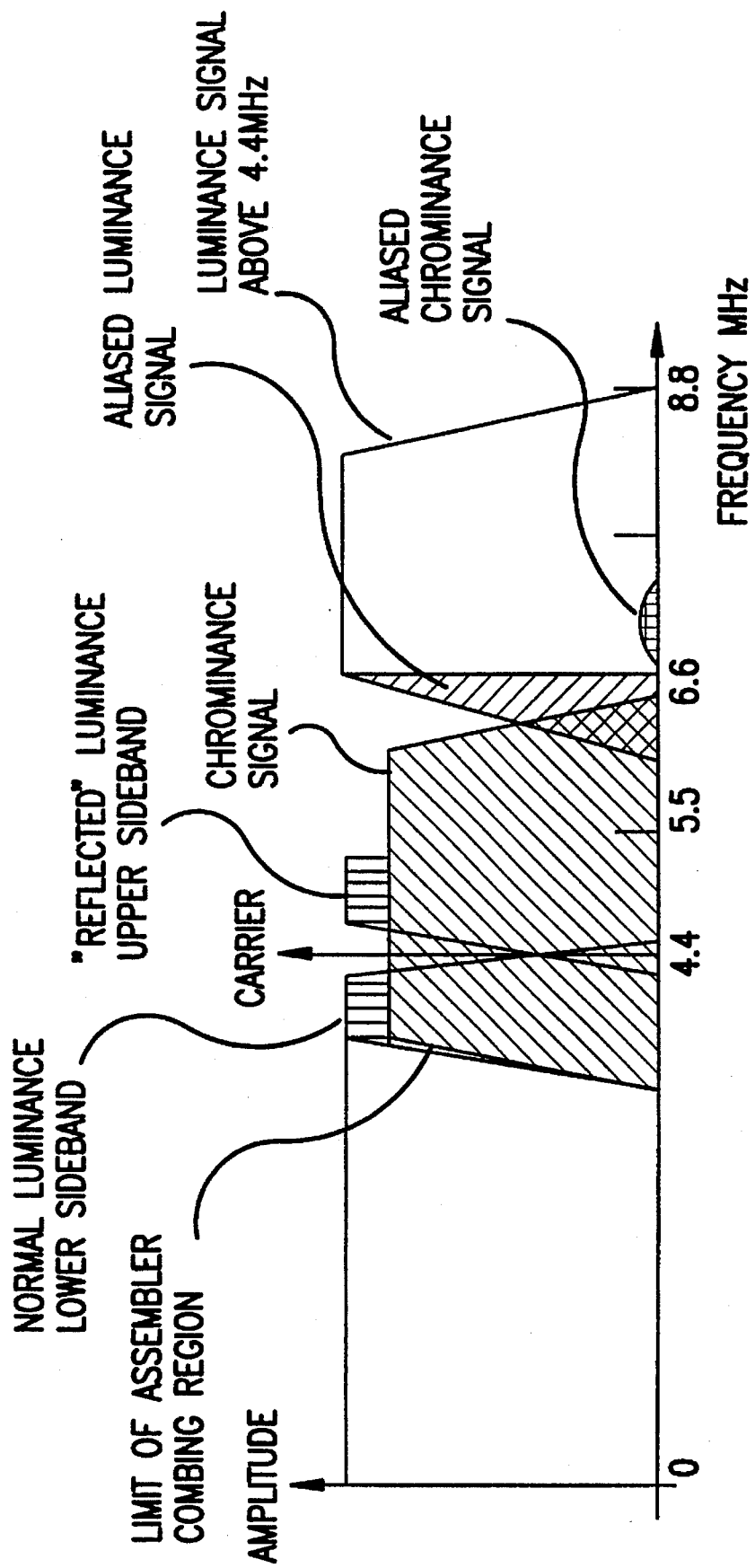
FIG. 4 is a diagram of the spectrum of the coded video signal according to the preferred embodiment of the present invention.

The one-dimensional spectrum of the resulting Extended Weston Clean PAL signal is shown in FIG. 4, assuming the PAL system I standard. The spectrum below about 5.5 MHz is very similar to a conventional Weston PAL signal, except that a small amount of aliasing will be present in the luminance band due to the nature of the sub-band coding process used to split the luminance spectrum. The high luminance frequencies mainly occupy the region of the signal above 3 fsc/2 (6.6 MHz), with the chrominance signal being mainly below this frequency. There is a small amount of aliased luminance information present in the chrominance signal and vice versa, due to the nature of the inverse sub-band process used to combine these two signals.

The digital signal sampled at 4 fsc representing this coded signal may be converted to an analogue signal using a digital-to-analogue converter (DAC) and an analogue post-filter. For it to be possible to subsequently digitized the resulting analogue signal for the purposes of decoding whilst maintaining a flat frequency response from zero frequency to 2 fsc, it is necessary for the combined effect of the post-filter after the DAC in the coder and the pre-filter before the analogue-to-digital converter (ADC) in the decoder to be a Nyquist filter. The use of a Nyquist filter in such a situation allows the aliasing caused by sampling in the ADC to cancel that produced by the DAC and is a well-known technique. The phase of the sampling in the DAC and the ADC must also be the same; this is easy to achieve since the sampling frequency in each case is derived from the color subcarrier frequency which is available at the start of every line as in a conventional PAL signal. If the filter product is not exactly Nyquist, for example due to losses in the signal path from coder to decoder, then some losses will occur between the 4 fsc sampled signal from the coder and the 4 fsc signal at the input to the decoder. The effect of slight losses to high frequencies is not serious if one-dimensional filtering techniques are used in the luminance pre- and post-filters, since losses will occur for high luminance frequencies only. However, if multi-dimensional filters and spectrum folding techniques have been used, it is more important that the channel provides an essentially transparent path for the 4 fsc samples.

A conventional PAL decoder that is only sensitive to frequencies below about 5.5 MHz will produce from this signal a picture essentially the same as it would produce from a Weston PAL signal, with the exception of the small amount of luminance aliasing. This can be minimised by careful design of the filters used to perform the sub-band splitting of the luminance. In addition, there may be a slight increase in cross-color due to aliased information from the upper luminance band appearing in the chrominance region. This can be minimized by careful design of the inverse sub-band filters used to combine chrominance and high-frequency luminance.

A PAL decoder embodying to the present invention performs the inverse processing to that carried out in the coder to regenerate the luminance signal sampled at 3 fsc and the chrominance sampled at fsc. Its operation will be readily understood from FIG. 2. The extended Weston PAL decoder shown at the bottom of FIG. 2 includes a Weston PAL splitter 130 comprising filters F3 and F4 coupled to receive the 4 fsc PAL signal at input 132. The output of filter F3 is sampled at 2 fsc in a sampler 134 to provide a low-frequency luminance output at 2 fsc. The output of filter F4 is demodulated at fsc in a demodulator 136, and the output applied to a splitter 140 which splits the chrominance and high-frequency luminance. To this end splitter 140 includes a circuit 142 which low-pass filters the input signal and then down-samples by a factor of two to provide the decoded U/V output sampled at fsc. It also includes a circuit 144 which high-pass filters the 2 fsc input and then down-samples by a factor of two. This signal is frequency inverted in a circuit 146.

A sub-band combiner 150 receives the luminance signal from splitter 130, and in a circuit 152 increases the sampling rate by a factor of three, low-pass filters the resultant, and then halves the sampling rate, to convert the sampling rate to 3 fsc. The signal from the inverter 146 in splitter 140 is applied to a circuit 154 in combiner 150 which increases the sampling rate by a factor of three, and high-pass filters the resultant. The 3 fsc outputs of circuits 152, 154, containing the low and high frequency luminance components, are added in an adder 156 to produce the decoded luminance output sampled at 3 fsc.

The Weston splitter filters F3 and F4 and the associated sampler 134 and demodulator 1.36 regenerate the 2 fsc samples that were presented to filters F1 and F2 in the coder. The signal from filter F4 is split into chrominance and high frequency luminance information using a sub-band coder (i.e. inverse sub-band decoder), which performs the reverse operation to the corresponding sub-band decoding process in the coder. The high frequency luminance signal is converted to a signal sampled at 3 fsc representing high frequencies by up-sampling followed by an appropriate sub-band synthesis filter. The low frequency luminance signal is converted to a signal sampled at 3 fsc representing low frequencies in a similar manner. The two signals are added together to regenerate the complete sampled luminance signal. The sampled luminance and chrominance signals are then post-filtered to the required output sampling rate; these filters may be simple one-dimensional filters or may be multi-dimensional filters exploiting sub-Nyquist sampling techniques as explained earlier.

The decoded signal will be free of cross-color and cross-luminance due to the characteristics of the filters used to separate the different parts of the coded signal. The luminance and chrominance resolution will be defined by the corresponding pre- and post-filters and in the simple case of one-dimensional filters will correspond to a horizontal resolution limit of 3 fsc/2 for luminance and fsc/2 for chrominance. As explained earlier, these figures can be extended by exchanging resolution between different parts of the spatio-temporal frequency domain by using the technique of sub-Nyquist sampling.

IMPLEMENTATION

There are several ways in which a coder and decoder according to the present invention may be implemented: the arrangement chosen will depend on the sampling rates used for the various parts of the signal and on the design of the filters.

A coder and decoder in accordance with the present invention could be implemented exactly as shown in FIG. 2, that is with various parts of the circuitry operating at clock rates of fsc, 2 fsc, 3 fsc and 4 fsc and so on. However, in many situations it is easier to implement the coder and decoder using circuitry operating at a single clock rate. For The preferred embodiment of the process described above in which the total bandwidth of the coded signal is 2 fsc, it is convenient to operate all circuitry at a rate of 4 fsc, since this rate provides a sufficient bandwidth to represent the coded signal and is also sufficient for the input and output signals as long as the system is designed for a horizontal luminance resolution of no more than 2 fsc.

Figure 5:
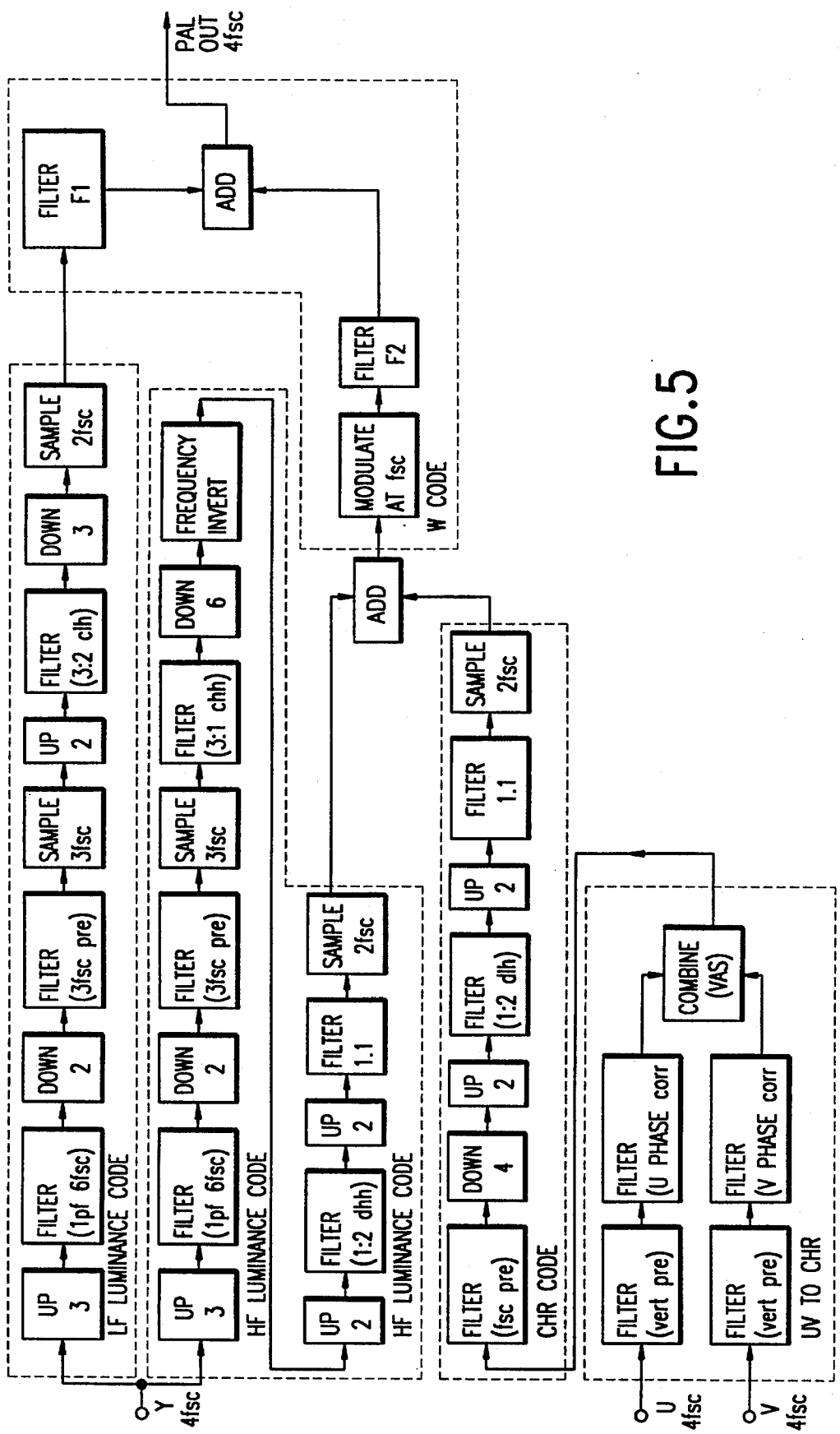
FIG. 5 is a block diagram of an embodiment of a coder according to the present invention using processing at a clock rate of 4 fsc throughout.

FIG. 5 shows a block diagram of a coder operating at a clock rate of 4 fsc. The following paragraphs summarize the operation of this implementation of the coder of FIG. 5. The techniques of digital signal processing used in implementing the coder of FIG. 2 in the form shown in FIG. 5 are well known in the field and so are only described briefly; and a detailed textual description of FIG. 5 is not necessary for the person skilled in this art in view of the detail presented in the figure.

In FIG. 5 the following abbreviations are used:

3:1 chh—Code low horizontal frequencies using a high pass sub-band analysis filter appropriate for 66%:33% split between low and high frequencies.

3:2 clh—As above but using a low pass analysis filter.

1:2 dhh—Decode high horizontal frequencies using a high pass sub-band synthesis filter appropriate for a 50%:50% split between low and high frequencies.

1:2 dlh—As above but using a low pass synthesis filter. (3:1 and 3:2 filters are each oversampled by 2 as they operate on data that is sampled at 3 fsc and thus has embedded zeroes).

VAS—V-axis switch (V chrominance signal multiplied by 1 or −1 depending on line number and added to U).

Sample—Multiply successive samples by 0, 1, 0, 1 . . . with line-alternating horizontal phase.

The analogue input signals (luminance Y, color difference signals U and V) are assumed to have been low-pass filtered to a bandwidth of 2 fsc and sampled at a rate of 4 fsc.

The block labelled LF LUMINANCE CODE is equivalent to an eight-phase filter operating at 4 fsc, with four of the eight phases being zero due to the 2 fsc sampling operation, i.e. it has four distinct phases. This block contains the operations necessary to perform the following operations:

1) Convert the input signal to a sampling rate of 6 fsc by up-sampling by a factor of 3, low-pass filtering and down-sampling by a factor of two (this is a well-known way to convert between two sampling frequencies);
2) pre-filter to give a pass-band that is supportable by sampling at 3 fsc;
3) sample the signal at 3 fsc by setting alternate samples to zero on a lattice which is quincunxial within a field;
4) filter this signal using a low-pass sub-band analysis filter and re-sample at 2 fsc. This process is carried out by up-sampling by a factor of two, filtering and then down-sampling by a factor of 3 followed by setting alternate samples in the resulting 4 fsc data stream to zero. The sub-band analysis filter is thus over-sampled by a factor of two since it is operating on oversampled data that contains zeroes inserted by the sampling operation at 3 fsc.

Since this block has both its input signal and output signal clocked at 4 fsc, it is possible to replace it with a single digital filter operating at 4 fsc/2 whose coefficients are switched from sample to sample in the manner required to emulate the combined effect of the processes in the block. It can be shown that such a filter has eight different sets of coefficients, four of which are all zero. The coefficient sets can be considered as two groups of four: one group being used on lines in which the first sample of the line falls on a sampled point of the 2 fsc lattice and the other group being used on lines whose first sample does not lie on the 2 fsc lattice. Thus the coefficient sets are used in the pattern:

| 1 | 2 | 3 | 4 | 1 | 2 | 3 | 4 | ... |
|---|---|---|---|---|---|---|---|---|
| 5 | 6 | 7 | 8 | 5 | 6 | 7 | 8 | ... |
| 1 | 2 | 3 | 4 | 1 | 2 | 3 | 4 | ... | where each line represents one line in a television field and each number represents the coefficient set used for that sample in the 4 fsc sampled signal. Coefficient sets 2, 4, 5, and 7 are all zero, due to the quincunxial 2 fsc sampling process which is the last stage of the process being implemented. In a typical implementation, each non-zero coefficient set may consist of 20–30 coefficients. These coefficients may be calculated by combining the coefficients of the filters that make up the combined process; one way of doing this is to use a computer to model the combined processes and measure the impulse response of the resulting combination as a function of the location of the impulse in relation to the sampling structures used.

The block labelled HF LUMINANCE CODE is equivalent to a sixteen-phase filter operating at 4 fsc, with eight phases being zero due to the 2 fsc sampling operation, and four of the remaining eight phases being equal to minus the other four, i.e. it has four distinct phases. This block performs the same steps 1)–3), followed by the high-pass sub-band analysis filter and down-sampler explained earlier. It then implements the horizontal frequency inversion (required to ensure that the high-frequency luminance signal undergoes no net inversion) and high-pass inverse sub-band coding operation. In order to ensure that the resulting samples at the rate 2 fsc lie on the correct sites in the 4 fsc data stream, the signal is upsampled by a factor of two and filtered with a two-tap horizontal filter whose coefficients are both unity. This replicates the 2 fsc samples in adjacent sample position; the 2 fsc sampling process then sets one of each pair of samples to zero in the same sampling phase as that used in the luminance signal processing described above. Use of the correct phase is essential for the correct operation of the Weston PAL assembler and splitter. All the processes in this block can be realised using a single digital filter whose coefficients are changed at sample rate, as for the previous block.

The block labelled UV to CHR forms the combined chrominance signal from the two color difference signals U and V which are digitized at a sampling rate of 4 fsc. Its operation is in accordance with conventional Weston Clean PAL coding which is described in the references mentioned earlier and so is only briefly summarised here. Each signal is subject to a vertical (or vertical-temporal) pre-filter prior to vertical sub-sampling when the combined chrominance signal is formed. Before combining, each signal is filtered to introduce a small delay. The object of this is to ensure the correct relative horizontal positioning of the luminance and chrominance components in a picture decoded using a normal PAL decoder: the filters in the Weston assembler introduce a slight differential delay between luminance and chrominance which is removed in a Weston decoder but not in a normal PAL decoder. The combiner forms a weighted sum of U+V on alternate field lines, and a weighted sum of U−V on the other lines.

The block labelled CHR CODE is equivalent to an eight-phase filter operating at 4 fsc, with four of the eight phases being zero due to the 2 fsc sampling operation and two of the remaining four being equal to the other two, i.e. it has two distinct phases. This block takes the combined chrominance signal sampled at 4 fsc and generates samples at a rate of 4 fsc of which alternate samples are zero. The non-zero samples represent the chrominance part of the signal sampled at 2 fsc. The block implements a pre-filter and associated sampler at fsc to obtain the chrominance samples to be encoded. These samples are subject to the low-pass synthesis filter of an inverse sub-band coder so that they form low frequency components in the 2 fsc output signal. As before, this block can be implemented by a single filter operating at 4 fsc with multiple sets of coefficients.

The block labelled W CODE implements the Weston Clean PAL assembler in accordance with the prior art of Weston Clean PAL coding. Each filter typically consists of a two-dimensional filter whose aperture covers two successive field lines; thus each filter includes a line delay. The coded signal is generated at a sample rate of 4 fsc and may be converted to analogue form using a DAC and post-filter as already described. The signal requires the addition of subcarrier burst and sync pulses, line and field blanking form the final PAL signal.

Figure 6:
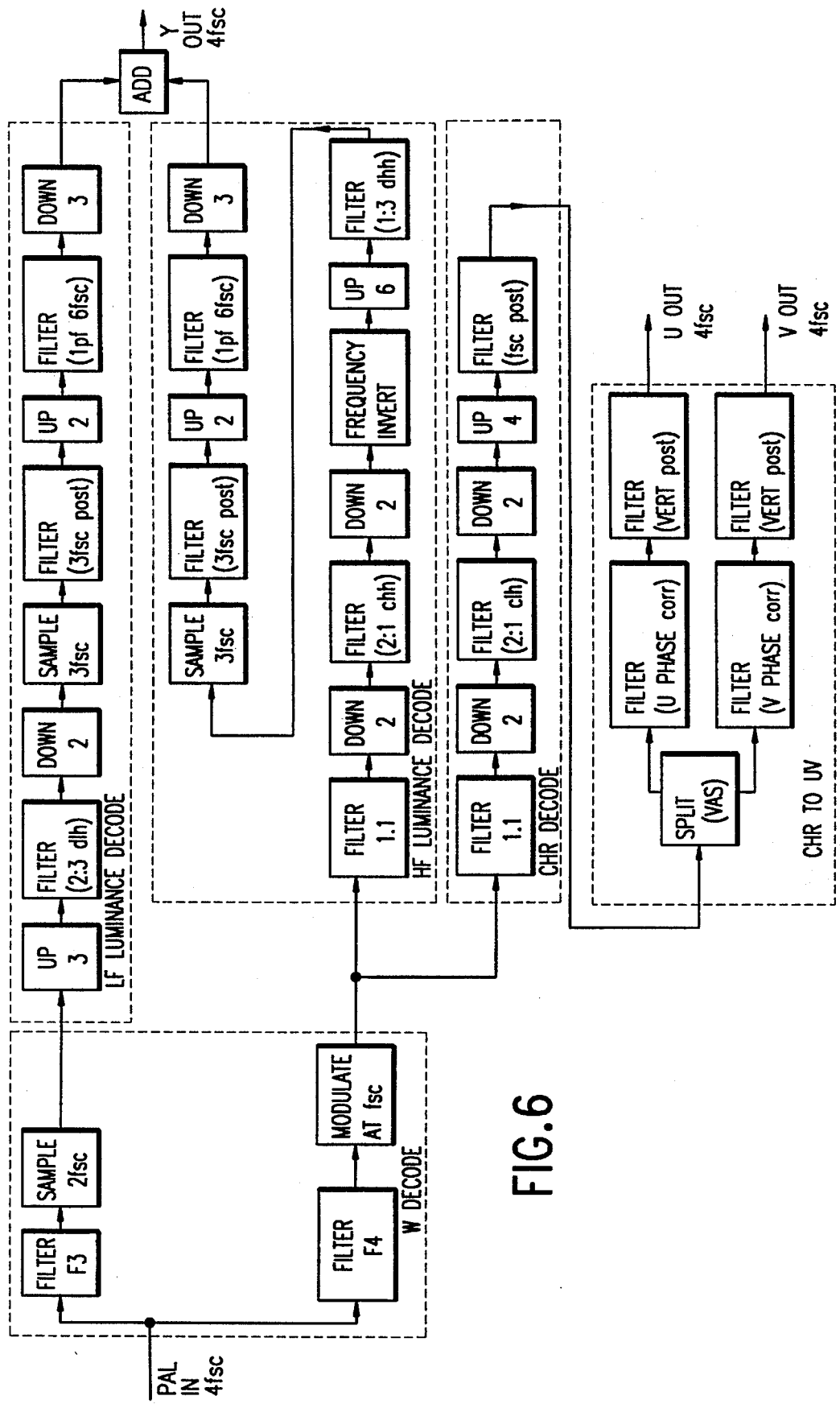
FIG. 6 is a block diagram of an embodiment of a decoder according to the present invention using processing at a clock rate of 4 fsc throughout.

FIG. 6 shows the implementation of a decoder operating at a sampling rate of 4 fsc throughout. It is derived from the block diagram of the decoder in FIG. 2 in the same way as described above for the encoder of FIG. 5. FIG. 6 indicates the number of phases that each filter requires.

In FIG. 6 the following abbreviations are used:

2:1 clh—Code low horizontal frequencies using a low-pass sub-band analysis filter appropriate for an equal split between low and high frequencies.

2:1 chh—As above but using a high-pass analysis filter.

2:3 dlh—Decode low horizontal frequencies using a low-pass sub-band synthesis filter appropriate for a 66%:33% split between low and high frequencies.

1:3 dhh—As above but using a high-pass synthesis filter. (1:3 and 2:3 filters are each oversampled by 2 as they operate on data that is sampled at 3 fsc and thus has embedded zeroes).

VAS V—axis switch (V chrominance signal multiplied by 1 or −1 depending on line number).

sample—Multiply successive samples by 0, 1, 0, 1 . . . with line-alternating horizontal phase.

up,down—Supersample (insert zeroes) or subsample by the given ratio horizontally.

In FIG. 6, the block labelled LF LUMINANCE DECODE is equivalent to an eight phase filter operating at 4 fsc, with four of the eight phases being equal to the other four in a different order, i.e. it has four distinct phases. The block labelled HF LUMINANCE DECODE is equivalent to a sixteen phase filter operating at 4 fsc, with eight of the phases being equal to minus the other eight, i.e. it has eight distinct phases. Finally the block labelled CHR DECODE is equivalent to a four phase filter operating at 4 fsc, i.e. it has four distinct phases. The rest of the operation will be apparent from the discussion of FIG. 5 above.

The encoder and decoder shown in FIGS. 5 and 6 may be constructed using commercially available integrated circuits. For example one or more SGS-Thomson A110 digital filters may be used to implement each phase of each filter, with multiplexers being used to select the appropriate phase.

ALTERNATIVE EMBODIMENTS

The present invention has been described in the context of a coded signal having a bandwidth of 2 fsc, yielding a luminance bandwidth of 3 fsc/2 and a chrominance bandwidth of fsc/2 in the situation when sub-Nyquist sampling techniques are not used in the pre- and post-filters. However, it will be understood that the invention can be applied using other figures for these bandwidths, by changing the ratios by which the sub-band and inverse sub-band filters split and construct the various signals. For example, if a channel bandwidth of only 5 fsc/3 was available, the invention could be used to provide a luminance bandwidth of 4 fsc/3 and a chrominance bandwidth of fsc/3 by sampling the input luminance signal at 8 fsc/3 and splitting it into a low frequency signal sampled at 2 fsc and a high frequency signal sampled at 2 fsc/3.

Another possible embodiment of this system uses the luminance and chrominance sampling rates of the preferred embodiment but obtains the 3 fsc luminance samples directly from samples in a luminance signal sampled at 13.5 MHz according to CCIR Recommendation 601. Since the sampling rate of 3 fsc is approximately 3×4.43=13.3 MHz, the length of the active line needs to be extended by a factor 13.5/13.3 in order to accommodate all the samples and by a further factor of 720/702 in order to maintain the guard bands at each end of the active line that exists in the aforementioned CCIR Recommendation. This results in an active line time of 54.2 µs compared with 52 µs for a conventional PAL system. The interface between the two sampling rates can easily be achieved using commercially available dual port first-in-first-out buffers such as the Hitachi HM53051P. A similar approach can be used for the chrominance signals, which are sampled at 6.75 MHz in CCIR Rec. 601. By up-sampling by a factor of 2, low-pass filtering and down-sampling by a factor of 3, the correct chrominance sample density for sampling at fsc/2 on the slightly extended active line is obtained. When used in conjunction with equipment that can convey a video signal having this slightly extended active line time, this approach allows digital luminance signals sampled at 13.5 MHz to be conveyed transparently, and also simplifies the coder and decoder since luminance pre- and post-filters and analogue/ digital converters are not required. Although transparent transmission of chrominance is not possible due to the significantly lower horizontal and vertical bandwidth of chrominance in the extended Weston clean PAL system, this approach still results in some simplification of encoder and decoder hardware associated with chrominance.

It is possible for the amplitude of the signal coded according to this invention to exceed the normal range allowed for a PAL signal, since the high frequency luminance signal may be expected to have a maximum amplitude equal to that of the low frequency signal, which itself has a range of 700 mV, the range from black to peak white in a PAL signal. Therefore it may be advantageous to reduce the amplitude of the high frequency components prior to forming the combined signal to reduce the effect of errors caused when the signal is limited. It is also possible to use a non-linear attenuator so that the amplitude of the high frequency signal is reduced by a greater factor for high signal levels. This is a well-known method to reduce the amplitude of a signal without incurring a significant noise penalty in the decoded picture. The use of such an attenuator would also help to reduce the appearance of cross-color in the signal decoded using a conventional PAL decoder, since it will reduce the amplitude of the aliased high frequency luminance signal which intrudes slightly into the chrominance region.

MODIFICATION

Figure 7:
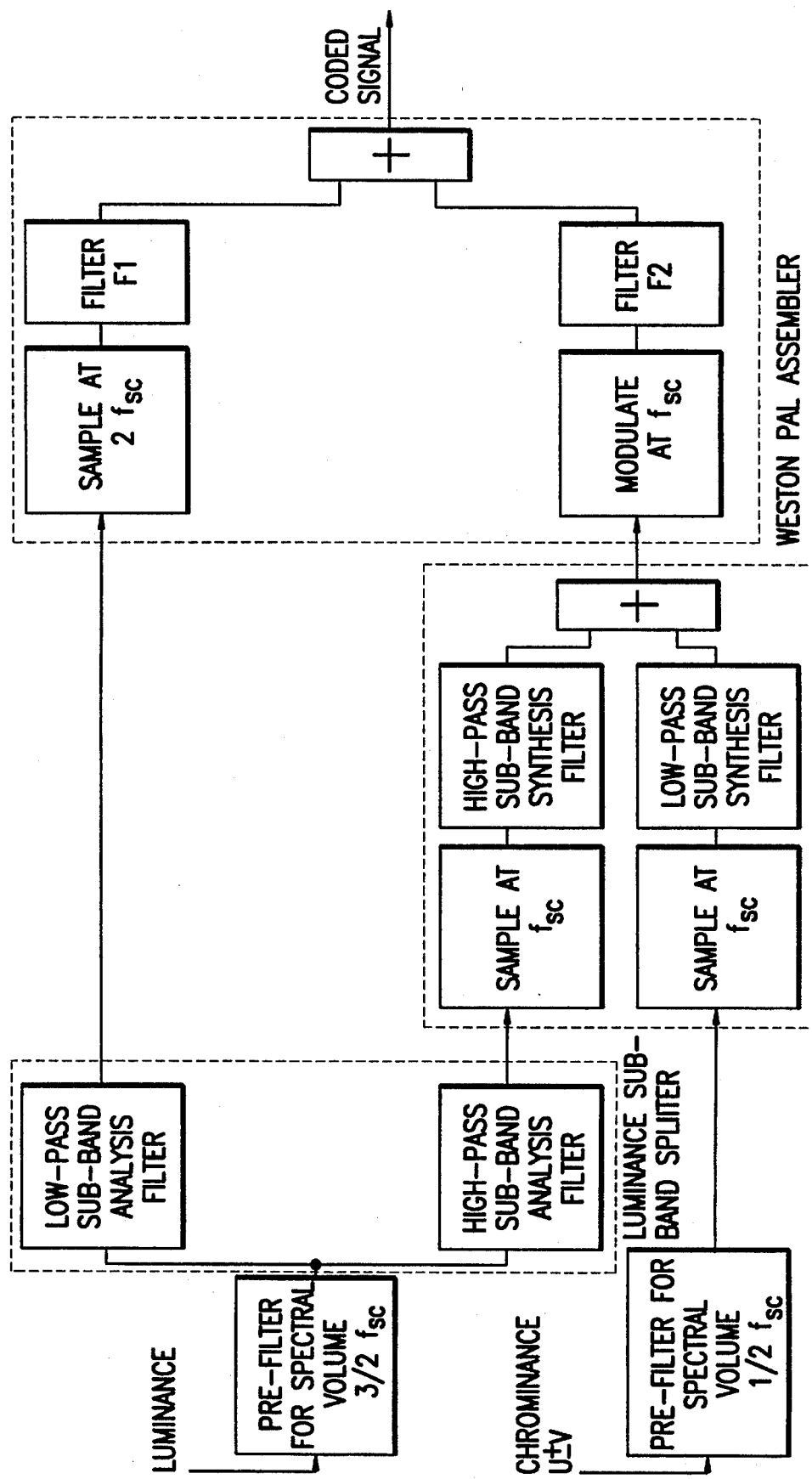
FIG. 7 is a block diagram of an encoder in a modified embodiment of the present invention.
Figure 8:
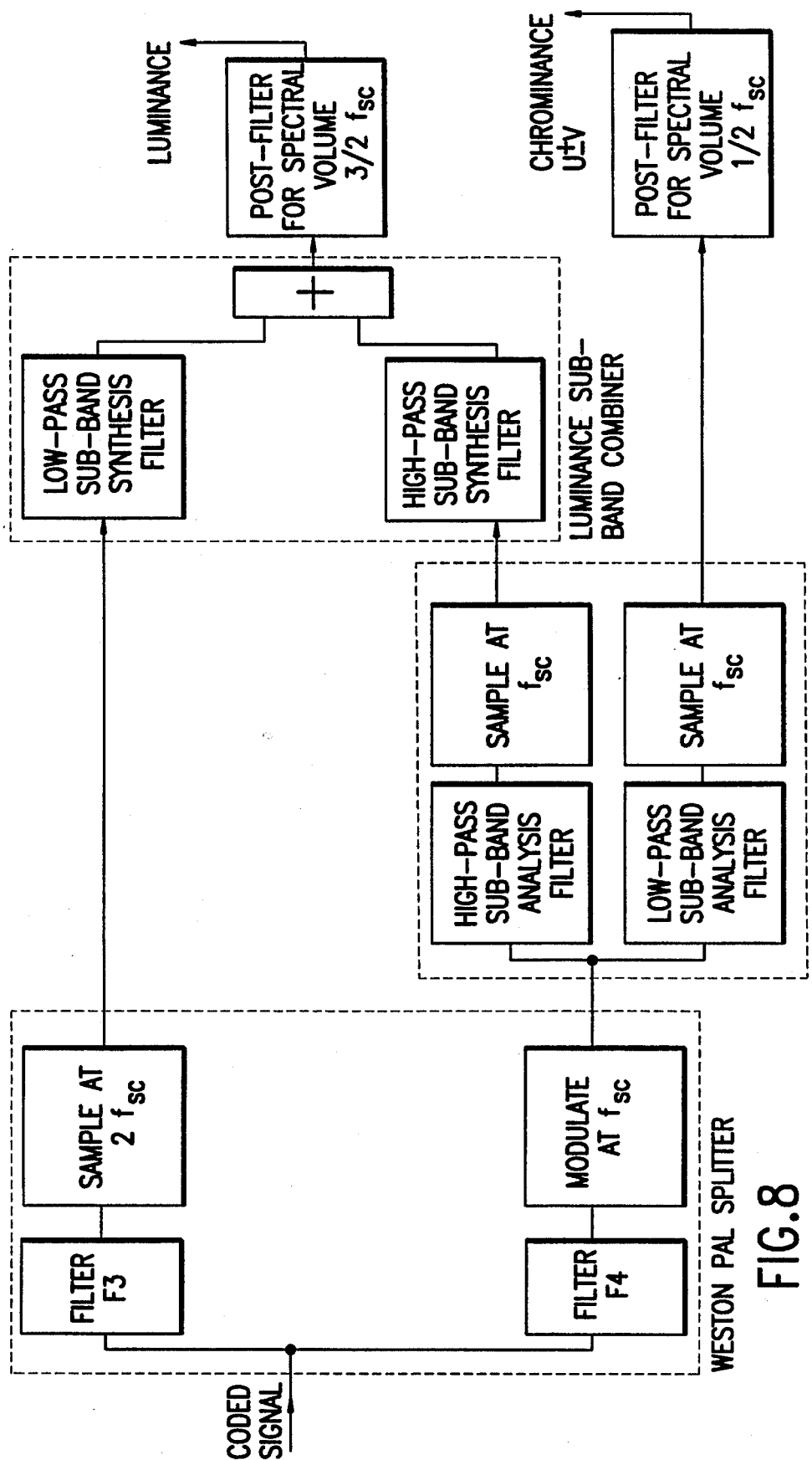
FIG. 8 is a block diagram of a decoder corresponding to the encoder of FIG. 7.

The coder and decoder of FIG. 2 can be modified as shown with the coder of FIG. 7 and decoder of FIG. 8.

Referring to FIG. 7, the chrominance signal is fed to the low-frequency input of an inverse sub-band coder, which produces a signal sampled at 2 fsc, with the chrominance signal occupying the lower half of the spectrum. The high frequency luminance signal is fed to the high-frequency input, which places the signal in the upper half of the spectrum. The high-frequency luminance signal will become frequency-inverted by these operations, that is the highest luminance frequency will be adjacent to the upper end of the chrominance signal, and the lowest luminance frequency will be at the top of the band. The disadvantage of this is that the effect of a low-pass filter on the final coded signal will be to attenuate lower luminance frequencies more severely than higher ones; therefore it may be advantageous to frequency-invert the high-frequency luminance signal before combining it with the chrominance so that the spectrum undergoes no net frequency inversion. This may be achieved by inverting alternate samples of the high frequency luminance signal prior to the inverse sub-band coder and is equivalent to modulation at fsc/2. Since the inverse processing needs to be applied in the decoder, it is of course essential that the same phase of fsc/2 is used. A phase reference for this signal can, for example, be obtained by reference to the line sync pulses. However, in applications such as videotape editing where the position of these pulses relative to the video signal may change, the use of frequency inversion may be inappropriate. In such circumstances, the effect of a low-pass filter on the coded signal can be made less severe by the use of multidimensional sub-band filtering techniques as described elsewhere in this specification.

The combined signal containing chrominance information in the lower half of the band and high luminance frequencies in the upper half of the band is modulated at fsc and passed to the input of filter F2 in the Weston assembler. The operation of the assembler itself is exactly as in conventional Weston Clean PAL. The spectrum of the resulting Extended Weston Clean PAL signal is shown in FIG. 4, described above.

As noted above in relation to FIG. 2, the digital signal sampled at 4 fsc representing this coded signal may be converted to an analogue signal using a digital-to-analogue converter (DAC) and an analogue post-filter. For it to be possible to subsequently digitize the resulting analogue signal for the purposes of decoding whilst maintaining a flat frequency response from zero frequency to 2 fsc, it is necessary for the combined effect of the post-filter after the DAC in the coder and the pre-filter before the analogue-to-digital converter (ADC) in the decoder to be a Nyquist filter. One way in which this can be achieved is to split the filter equally between the DAC post-filter and the ADC pre-filter; in this case each filter is called square-root Nyquist. The use of a Nyquist filter in such a situation allows the aliasing caused by sampling in the ADC to cancel that produced by the DAC and is a well-known technique. The phase of the sampling in the DAC and the ADC must also be the same; this is easy to achieve since the sampling frequency in each case is derived from the color subcarrier frequency which is available in the burst at the start of every line as in a conventional PAL signal. A good approximation to a square-root Nyquist response can be achieved using analogue filters; alternatively the signal sampled at 4 fsc can be over-sampled to 8 fsc for example, using a digital half-Nyquist filter. The over-sampled signal can then be passed to a DAC operating at 8 fsc and through an analogue filter whose specification is much less critical; this is a well-known approach. If the filter product is not exactly Nyquist, for example due to losses in the signal path from coder to decoder or imperfections in the filters themselves, then some losses will occur between the 4 fsc sampled signal from the coder and the 4 fsc signal at the input to the decoder. The effect that these losses will have on the decoded signal depends on the design of the various filters in the system; ways of ameliorating potential losses will be discussed later.

A conventional PAL decoder that is only sensitive to frequencies below about 5.5 MHz will produce from this signal a picture essentially the same as it would produce from a conventional Weston PAL signal, with the exception of the small amount of luminance aliasing. This can be minimised by careful design of the filters used to perform the sub-band splitting of the luminance. In addition, there may be a very small amount of cross-color due to aliased information from the upper luminance band appearing in the chrominance region. This can be virtually eliminated by careful design of the inverse sub-band filters used to combine chrominance and high-frequency luminance.

The PAL decoder illustrated in FIG. 8 performs the inverse processing to that carried out in the coder to regenerate the luminance and chrominance signals. Its operation will be readily understood from FIG. 8. The Weston splitter filters F3 and F4 and the associated sampler and demodulator regenerate the 2 fsc samples that were presented to filters F1 and F2 in the coder. The signal from F4 is split into chrominance and high-frequency luminance information using a sub-band coder (i.e. inverse sub-band decoder), which performs the reverse operation to the corresponding sub-band decoding process in the coder. The high-frequency luminance signal is passed to an appropriate high-pass sub-band synthesis filter. The low-frequency luminance signal is passed to a corresponding low-pass sub-band synthesis filter. The two signals are added together to regenerate the complete luminance signal. The sampled luminance and chrominance signals are then post-filtered to the required output sampling rate; these filters may be simple one-dimensional filters or may be multi-dimensional filters exploiting sub-Nyquist sampling techniques as explained earlier.

The decoded signal will be free of cross-color and cross-luminance due to the characteristics of the filters used to separate she different parts of the coded signal. The luminance and chrominance resolution will be defined by the corresponding pre- and post-filters and in the simple case of one-dimensional filters will correspond to a horizontal resolution limit of 3 fsc/2 for luminance and fcs/2 for chrominance. As explained earlier, these figures can be extended by exchanging resolution between different parts of the spatio-temporal frequency domain by using the technique of sub-Nyquist sampling.

CONSIDERATIONS IN THE DESIGN OF FILTERS

Having described the invention in the context of a coded digital signal with a sample rate of 4 fsc and band volumes of 3/2 fsc and fsc/2, some aspects of the design of filters for such a system will be considered. In particular the design of filters for a coder and decoder based on sampling the luminance signal at 4 fsc and using sub-band filters appropriate for equal band splits will be discussed.

Providing that the sub-band filters used to split the luminance band obey the four relationships listed earlier in the context of assembler and splitter filters for perfect reconstruction, and furthermore that the low-pass and high-pass sub-band filters have gains of unity and zero in the region 3 fsc/2 to 2 fsc (the region not supported by the subsampling of the high frequency sub-band), then the transparency of the coding and decoding process for luminance will depend only on the design of the pre- and post-filters. However, this is no longer true if the coded signal is subject to distortions such as low-pass filtering. Indeed, such filtering can cause losses of luminance frequencies just above fsc if the spectrum of the high-frequency luminance signal is inverted in the coded signal as explained above.

Figure 9:
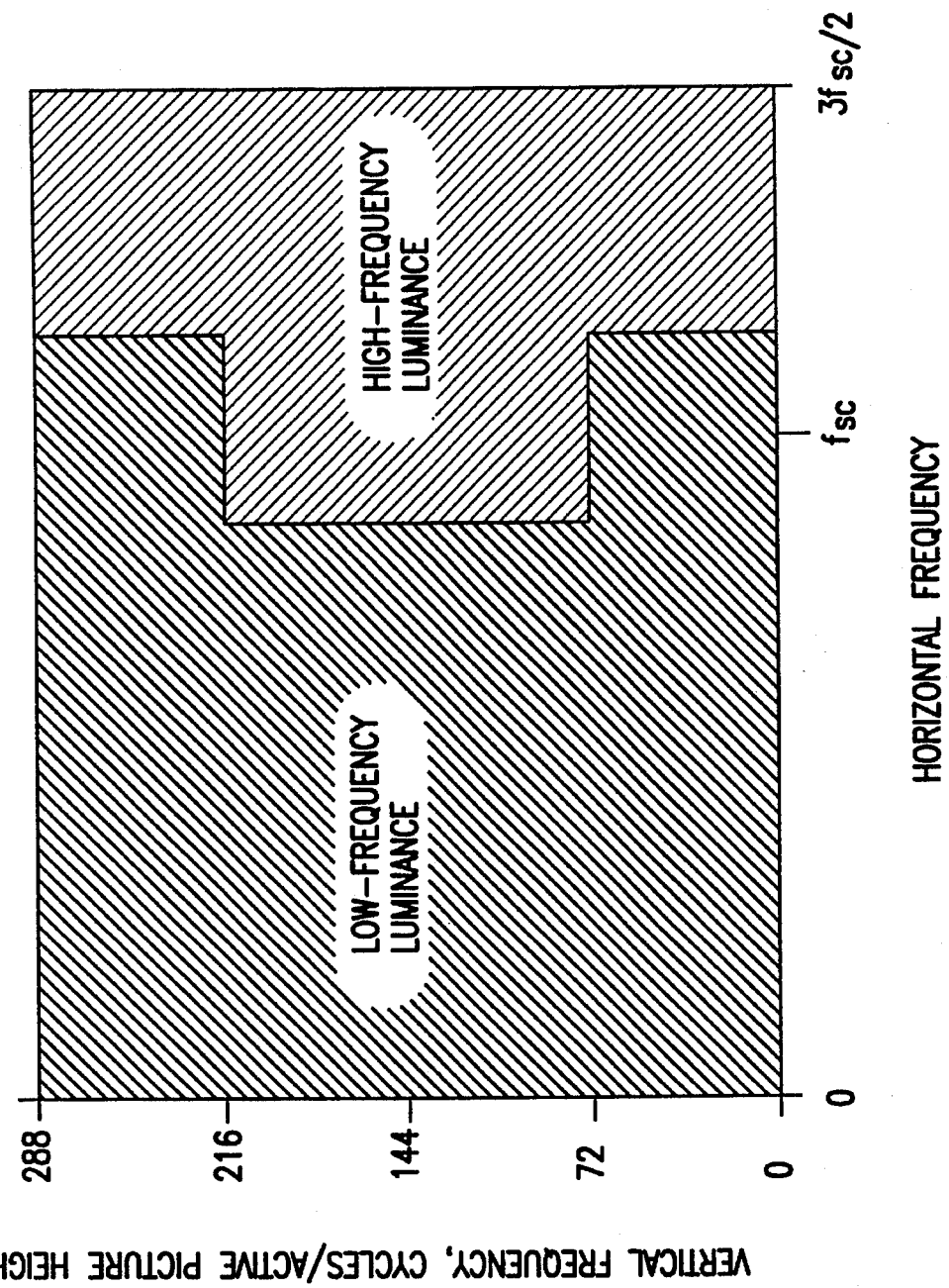
FIG. 9 is a diagram showing an example of how the luminance spectrum of a signal may be split into low frequency and high frequency parts using two-dimensional sub-band filters.

In order to reduce the severity of the effect of a low-pass filter on the coded signal, it is possible to use two-dimensional filters to split the luminance spectrum. FIG. 9 shows how the spectrum may be divided using such filters in order to allow low vertical frequencies with a horizontal frequency beyond fsc to be carried in the low-frequency sub-band. Such sub-band filters may be designed using the same method as used to design the assembler and splitter filters F1–F4, since these filters are themselves a form of two-dimensional sub-band filter. The vertical frequency response is mirrored about 144 cycles per active picture height (the highest vertical resolution obtainable within one interlaced field) because the filters act only within a field; this is true of all intra-field filters.

Consider a signal coded according to the present invention in which filters of the form shown in FIG. 9 are used to split the luminance signal. If the coded signal is formed with the high luminance frequencies inverted as described earlier, then it can be shown that the luminance frequencies travelling at the highest frequency in the coded signal correspond to those in the original signal in the region of fsc at vertical frequencies in the range 72–216 cycles per picture height. Thus losses to the coded signal at high frequencies will only affect this region of the spectrum of the decoded signal.

A further advantage to using the kind of two-dimensional luminance sub-band split shown in FIG. 9 lies in improving the forward and reverse compatibility of the coder; that is the quality of the signal obtained by using a conventional PAL decoder to decode a signal coded according to the present invention, and the quality obtained when using a decoder according to the present invention to decode a normal PAL signal. This is particularly true if the shape of the pass-band of the low-pass sub-band analysis filter closely matches that of the assembler filter F1. In this situation, F1 acts as a matched post-filter following prefiltering by the low-pass sub-band analysis filter and sampling at 2 fsc in the assembler. Thus all the frequencies transmitted via the low-frequency path, including the luminance frequencies above fsc within the passband of the low-pass sub-band filter, travel in the same part of the signal spectrum as they would in a normal PAL signal. Indeed, the luminance sub-band analysis and synthesis filters can be chosen to be identical to the filters F1–F4 used in the assembler and splitter. It is advantageous to use F3 as the low-pass analysis filter rather than F1 since the vertical phase characteristics of F1 and F3 are equal and opposite and will therefore cancel, so ensuring a uniform group delay for the luminance signal in the coded picture.

IMPLEMENTATION OF MODIFICATION

The implementation described above with reference to FIGS. 5 and 6 is appropriate when the luminance sub-band filters are designed for performing an unequal split of a signal into the low two-thirds and the upper third of the spectrum, and a luminance signal sampled at 3 fsc is created explicitly in the coder. The following implementation is appropriate where the luminance sub-band filters are designed for performing equal splits and no luminance signal actually sampled at 3 fsc is ever present.

To implement a coder based on luminance sub-band filters that perform equal band splits, simpler circuitry is required compared with that described above. Referring to FIG. 7, each of the filters shown may be implemented as a fixed digital filter operating at a sample rate of 4 fsc. The sampling and modulation processes may be implemented simply by setting appropriate samples to zero, inverting samples or passing samples unchanged as appropriate. The filters could be implemented using integrated circuits such as the Harris HSP43168, which can take advantage of the symmetry of filter coefficients, the presence of zeroes on input samples and the subsampling of the output, to make efficient use of the multipliers they contain. For example, one of these circuits can implement a horizontal filter having 31 taps if the filter is symmetrical and half of the input samples are zero or half the output samples are discarded. It is possible to design the filters in the coder of FIG. 7 to have 31 tapes or less, allowing a coder or decoder to be implemented very efficiently.

The sub-band synthesis filters used to join the chrominance and high-frequency luminance signals are combining two signals sampled at fsc to produce a signal sampled at 2 fsc. These filters can be implemented at 4 fsc by inserting a zero coefficient between adjacent filter coefficients; alternatively the lower sampling rate can be exploited to enable efficient use to be made of the filtering circuitry as explained above.

A decoder according to FIG. 8 may be implemented using the same techniques as described in connection with the coder.

NTSC

Although the invention has been described in the context of the PAL coding system, it will be understood that the invention is equally applicable to the NTSC coding system, using perturbed forms of the NTSC subcarrier, appropriate means for forming the chrominance signal and an assembler and splitter operating over the appropriate frequency band as described in our U.K. Patent 2,045,577B (U.S. Pat. No. 4,322,739).

We claim:

1. A method of coding sampled luminance and chrominance input video signals to provide a composite video output signal which consists of:

(a) a signal representing low frequency luminance information predominantly occupying in the composite signal frequencies in the range from zero to the color subcarrier frequency;

(b) a signal representing chrominance information predominantly occupying in the composite signal frequencies from color subcarrier frequency to a predetermined higher frequency; and (c) a signal representing high luminance frequencies predominantly occupying in the composite signal frequencies from the predetermined higher frequency to an upper limit;

the method comprising the steps of:

sub-band analysis filtering the sampled luminance input video signal into a low-frequency luminance signal and a high-frequency luminance signal;

sub-band synthesis filtering the high-frequency luminance signal and the sampled chrominance input video signal to form a combined high-frequency signal; and phase-segregated coding the low-frequency luminance signal and the combined high-frequency signal to provide the composite video output signal.

2. A method according to claim 1, in which the bandwidth of the chrominance signal and the high-frequency luminance signal are each substantially equal to half the subcarrier frequency, such that the bandwidth of the composite video signal is substantially equal to twice the subcarrier frequency.

3. A method according to claim 1, in which the high-frequency luminance signal is attenuated before combining with the chrominance signal.

4. A method according to claim 3, in which the attenuation is non-linear.

5. A method according to claim 1, in which the luminance input signal is sampled using a sub-Nyquist sampling frequency.

6. A method according to claim 1, in which the chrominance input signal is sampled using a sub-Nyquist sampling frequency.

7. A method according to claim 1, in which the luminance input signal is derived from samples of a luminance signal sampled at a frequency of about 13.5 Mhz.

8. A method according to claim 1, in which the luminance input signal is derived from samples of a luminance signal sampled at a rate exceeding twice the color sub-carrier frequency by extending the duration of an active line portion which carries picture image information in the coded signal to accommodate all the samples.

9. A method according to claim 1, in which the composite video output signal is a PAL-compatible signal, and the phase-segregated coding comprises phase-segregated PAL coding.

10. A method according to claim 1, in which the composite video output signal is an NTSC-compatible signal, and the phase-segregated coding comprises phase-segregated NTSC coding.

11. A method according to claim 1, in which the sub-band analysis and synthesis filtering comprises two-dimensional filtering, which allows low vertical luminance frequencies having horizontal frequencies greater than the color subcarrier frequency to travel in the low-frequency luminance signal.

12. A method according to claim 1, in which the high-frequency luminance signal is frequency inverted before forming the combined high-frequency signal.

13. Apparatus for coding sampled luminance and chrominance input video signals to provide a composite video output signal which consists of:

(a) a signal representing low frequency luminance information predominantly occupying in the composite signal frequencies in the range from zero to the color subcarrier frequency;

(b) a signal representing chrominance information predominantly occupying in the composite signal frequencies from color subcarrier frequency to a predetermined higher frequency; and (c) a signal representing high luminance frequencies predominantly occupying in the composite signal frequencies from the predetermined higher frequency to an upper limit;

the apparatus comprising:

luminance signal input means for receiving a sampled luminance input video signal;

chrominance signal input means for receiving a sampled chrominance input video signal;

sub-band analysis filter means coupled to the luminance signal input means for filtering the luminance input video signal to provide at a first output a low-frequency luminance signal and at a second output a high-frequency luminance signal;

sub-band synthesis filter means coupled to the chrominance signal input means and to the second output of the sub-band analysis filter means for filtering the chrominance input video signal and the high-frequency luminance signal to provide at its output a combined high-frequency signal; and phase-segregated coding means coupled to the first output of the sub-band analysis filter means and to the output of the sub-band synthesis filter means for coding the low-frequency luminance signal and the combined high-frequency signal to provide a composite video output signal.

14. A method of decoding a sampled composite video input signal which consists of:

(a) a signal representing low frequency luminance information predominantly occupying in the composite signal frequencies in the range from zero to the color subcarrier frequency;

(b) a signal representing chrominance information predominantly occupying in the composite signal frequencies from color subcarrier frequency to a predetermined higher frequency; and (c) a signal representing high luminance frequencies predominantly occupying in the composite signal frequencies from the predetermined higher frequency to an upper limit;

to provide luminance and chrominance output signals, the method comprising the steps of:

phase-segregated decoding the sampled composite video input signal to provide a low-frequency luminance signal and a combined high-frequency signal;

sub-band analysis filtering the combined high-frequency signal to provide a high-frequency luminance signal and a chrominance output signal; and sub-band synthesis filtering the low-frequency luminance signal and the high-frequency luminance signal to provide a full-bandwidth luminance output signal.

15. Apparatus for decoding a sampled composite video input signal which consists of:

(a) a signal representing low frequency luminance information predominantly occupying in the composite signal frequencies in the range from zero to the color subcarrier frequency:

(b) a signal representing chrominance information predominantly occupying in the composite signal frequencies from color subcarrier frequency to a predetermined higher frequency; and (c) a signal representing high luminance frequencies predominantly occupying in the composite signal frequencies from the predetermined higher frequency to an upper limit;

to provide luminance and chrominance output signals, the apparatus comprising:

input means for receiving a sampled composite video input signal;

phase-segregated decoding means coupled to the input means to provide at a first output a low-frequency luminance signal and at a second output a combined high-frequency signal:

sub-band analysis filter means coupled to the second output of the phase-segregated decoding means to provide at a first output a high-frequency luminance signal and at a second output a chrominance output signal; and sub-band synthesis filter means coupled to the first output of the phase-segregated decoding means and to the first output of the sub-band analysis filter means to provide a full-bandwidth luminance output signal.

* * * * *